United States Patent
Morikawa et al.

(10) Patent No.: US 9,715,648 B2
(45) Date of Patent: Jul. 25, 2017

(54) INFORMATION RECORDING MEDIUM

(71) Applicant: TOPPAN TDK LABEL CO., LTD., Tokyo (JP)

(72) Inventors: Tomoya Morikawa, Tokyo (JP); Katsumi Saito, Tokyo (JP); Hideaki Shinozaki, Tokyo (JP); Masaru Matsuda, Tokyo (JP); Akihiro Iikuma, Tokyo (JP)

(73) Assignee: TOPPAN TDK LABEL CO., LTD., Tokyo (JP)

( * ) Notice: Subject to any disclaimer, the term of this patent is extended or adjusted under 35 U.S.C. 154(b) by 0 days.

(21) Appl. No.: 15/335,292

(22) Filed: Oct. 26, 2016

(65) Prior Publication Data

US 2017/0124443 A1    May 4, 2017

(30) Foreign Application Priority Data

Oct. 29, 2015  (JP) ................. 2015-213398

(51) Int. Cl.
G06K 19/06   (2006.01)
B41J 2/455   (2006.01)
B42D 25/41   (2014.01)
B41M 5/26    (2006.01)

(52) U.S. Cl.
CPC ......... G06K 19/06112 (2013.01); B41J 2/455 (2013.01); B41M 5/267 (2013.01); B42D 25/41 (2014.10)

(58) Field of Classification Search
CPC ....... G06K 19/06046; G06K 19/06112; B41M 5/267; B41M 7/0027; B41M 3/14; B42D 25/382; B42D 25/405; B42D 25/41; B41J 2/455

USPC .......................................... 235/491
See application file for complete search history.

(56) References Cited

U.S. PATENT DOCUMENTS

| | | | | |
|---|---|---|---|---|
| 5,575,418 A | * | 11/1996 | Wu ................ | A23B 7/148 229/120 |
| 8,448,853 B2 | * | 5/2013 | Lesur ............. | G06K 19/06046 235/375 |
| 2003/0234286 A1 | * | 12/2003 | Labrec ............ | B41M 3/14 235/380 |
| 2007/0164117 A1 | * | 7/2007 | Swiler ............ | B05D 5/06 235/491 |
| 2011/0148092 A1 | * | 6/2011 | Jarvis ............. | B41M 3/14 283/67 |
| 2011/0247683 A1 | * | 10/2011 | Watanabe ........ | H01L 31/048 136/251 |
| 2013/0082111 A1 | * | 4/2013 | Shigekawa ...... | G06K 19/06 235/487 |

FOREIGN PATENT DOCUMENTS

| | | |
|---|---|---|
| JP | H11235871 | 8/1999 |
| JP | 2007029757 | 2/2007 |

\* cited by examiner

*Primary Examiner* — Claude J Brown
(74) *Attorney, Agent, or Firm* — Klein, O'Neill & Singh, LLP (57) ABSTRACT

An information recording medium includes a substrate; a laser marking layer that has a reduced reflectance to light with a wavelength of 780 nm or more and that is discolored by irradiation with laser light, the laser marking layer being provided on the substrate; and a shielding layer that transmits infrared light, and that absorbs or reflects visible light, the shielding layer being provided on the laser marking layer.

6 Claims, 6 Drawing Sheets

INFORMATION RECORDING MEDIUM

CROSS-REFERENCE TO RELATED APPLICATION

This application claims priority from Japanese Patent Application No. JP 2015-213398, filed Oct. 29, 2015, the disclosure of which is incorporated herein by reference in its entirety.

BACKGROUND

Technical Field

The present invention relates to an information recording medium in which predetermined information is recorded by irradiation of laser light and made readable in infrared light, while being made invisible externally in visible light. Particularly, the present invention relates to an information recording medium which is suitably used in a card game apparatus configured to advance a game by reading card data recorded in cards.

Related Art

In recent years, there have been card game apparatuses configured to advance a game by reading data recorded in cards. In such a card game apparatus, a player purchases game cards, and arranges these cards on a card arrangement panel of the card game apparatus, and the card game apparatus then reads card data recorded on the back surfaces of the cards by an image sensor in the apparatus, so that a game can be advanced.

For example, JP 2007-029757 A discloses a card to be used in a card game apparatus as described above.

In JP 2007-029757 A, an image, picture pattern or photograph that displays a game character is visibly printed on one surface of the card, and on the other surface of the card, information related to the game character is printed as a two-dimensional code pattern. The code pattern is formed in such a manner as to be discernable by an optical reading unit using an infrared ray, and further, a coating permeable to an infrared ray is applied to the surface of the code pattern to make the code pattern invisible externally, so that information on the card is hidden.

As a method for forming a code pattern on a card as described in JP 2007-029757 A, a printing method such as offset printing is commonly used. However, in the printing method such as offset printing, the number of code patterns that can be formed with one printing plate is limited, and therefore for increasing the number of code patterns, a large number of printing plates must be provided, so that game functions are inevitably limited. Accordingly, the demand for cards in which a specific code pattern can be arbitrarily formed for each card is increasing.

In this connection, a method for arbitrarily forming a specific code pattern for each card may be an inkjet method. In the inkjet method, an arbitrary code pattern can be formed on a card, but for hiding the code pattern so that it cannot be viewed, it is necessary to shield the code pattern by printing a picture pattern thereon after forming the code pattern. The code pattern cannot be discriminated after it is shielded, and therefore stock control is complicated and time-consuming.

Recently, printer-mounted card game apparatuses have been becoming trendy, and for the printer-mounted card game apparatuses, it is desired to print a card design on demand at the time of issuing a card, and also to form a specific code pattern for each card.

Under these situations, JPH 11-235871 A proposes an infrared ray absorbing marking forming article as a medium which is hardly recognizable in a visible light ray and which is recognizable in an infrared ray. The infrared ray absorbing marking forming article includes a substrate which at least partially includes a layer containing a visible light ray non-absorbing and infrared ray absorbing material, or a substrate which contains a visible light ray non-absorbing and infrared ray absorbing material, the infrared ray absorbing material having a characteristic in which infrared ray absorbance is at least partially lost by external energy.

According to the technique proposed in JPH 11-235871 A, predetermined information can be recorded in a medium such as a card by laser light, and the information recorded in the medium is invisible externally, but can be recognized in an infrared ray, so that complication of stock control when code patterns are formed on cards by an inkjet method as described above can be eliminated.

SUMMARY

In the technique described in JPH 11-235871 A, the infrared ray absorbing material has a characteristic in which infrared ray absorbance is lost by external energy, and therefore a pattern formed by irradiation of laser light has no change in external appearance although it can be observed in an infrared ray. Accordingly, whether writing is performed accurately and reliably cannot be easily determined in inspection conducted by irradiation of laser light. Further, there is a disadvantage that materials which have no change in external appearance in a visible range and which have a change in absorbance in an infrared range as described in JPH 11-235871 A are limited, so that the costs of materials in formation of a medium is high, and a difference of infrared absorption/non-absorption is small, leading to a reduction in degree of freedom in design.

In view of the problems described above, a main object of the present invention is to provide an information recording medium which can be easily designed at a relatively low cost and in which predetermined information is recorded by irradiation of laser light, and made readable in infrared light while being made invisible externally in visible light.

Another object of the present invention is to provide an information recording medium which can be kept in stock as white cards that do not require complicated stock control and in which at the time of issuing a card, a game character is printed, and also a code pattern related to the game character is formed as invisible shielded information.

An information recording medium according to the present invention includes: a substrate; a laser marking layer which has a reduced reflectance in apart or the whole of an infrared region of a wavelength of 780 nm or more and is discolored by irradiation of laser light, the laser marking layer being provided on the substrate; and a shielding layer which transmits infrared light and absorbs or reflects visible light to reduce transmission of visible light, the shielding layer being provided on the laser marking layer.

Here, for example, an image sensor (light-receiving sensor) such as CCD or CMOS can be suitably used as an infrared camera which reads as a code pattern a difference in reflectance in an infrared region of 780 nm or more between a laser light-irradiated section and a laser light-non-irradiated section of the laser marking layer. Since the spectral sensitivity curve varies depending on an infrared camera, one capable of performing detection with a high sensitivity in a wavelength region where the reflectance of the laser marking layer greatly changes is preferable. For increasing the imaging sensitivity of the infrared camera, it is desirable to emit infrared light for reading in addition to that of an infrared camera, and when LED is used as infrared light to be emitted, LED with a wavelength matched to the sensitivity of the infrared camera can be selected.

The irradiation angle of infrared light to the information recording medium and the light reception angle of the infrared camera are selected to suit the detection sensitivity of infrared light and the size of a housing of a reading apparatus that handles the information recording medium. Accordingly, the difference in reflectance between the laser light-irradiated section and the laser light-non-irradiated section of the laser marking layer is a difference in reflectance at the light reception angle of the infrared camera with respect to the irradiation angle of infrared light at the time of reading a code pattern.

Here, the reflectance of infrared light of a wavelength of 780 nm or more of the laser marking layer is decreased (changed) by preferably 3% or more, more preferably 10% or more by irradiation of laser light.

The discoloration of the laser marking layer means a visible color difference between the laser light-irradiated section and the laser light-non-irradiated section. The wavelength at which the color is visible ranges from 400 nm to 780 nm, and the reflectance at a wavelength of light reflected from the laser marking layer varies depending on a color. The reflectance of each wavelength component is capable of quantifying a color typically as in the L*a*b* color system provided in JIS Z8781-4(2013), where the color can be expressed as a numerical value with the brightness and the color difference defined as L and ΔE*ab, respectively, using a spectrophotometer. Discoloration can be expressed as a color difference ΔE*ab between the color L0*a0*b0* of the laser light-non-irradiated section and the color L1*a1*b1* of the laser light-irradiated section, and in the present invention, the discoloration of the laser marking layer means that the color difference ΔE*ab is 3 or more.

Here, it is preferable that the substrate is opaque to visible light. The purpose of ensuring that the substrate is opaque to visible light is to make invisible the discoloration (color difference between the non-irradiated section and the irradiated section) of the laser marking layer visible in laser light, and is achieved by any of the following three methods. The first method (method 1) includes making the layer white system by increasing the reflectance in the whole of the visible light region of 380 to 780 nm. The second method (method 2) includes making the layer black system by reducing the transmittance in the whole of the visible light region of 380 to 780 nm. The third method (method 3) includes reducing the transmittance so that a region where the L value is higher is matched to a region where the L value is lower in comparison between the irradiated section and the non-irradiated section. For example, when the color of the laser light-non-irradiated section is white system and the laser light-irradiated section is discolored to red system, the spectral reflectance at which a red color is exhibited is high in a wavelength of 600 to 700 nm, and therefore, when the transmittance of visible light of a wavelength of 380 to 600 nm of the substrate is reduced so that a white region where the L value is higher (non-irradiated section) turns red, the whole region becomes red, and thus a color difference is eliminated to make the discoloration invisible. It suffices that the transmittance even in a part of the visible light region can be reduced so that discoloration is invisible as described above.

When the substrate is formed of a material that transmits infrared light, the laser marking layer can be discolored by irradiation of laser light from either the front surface or the back surface of the information recording medium, and the formed discoloration pattern of the laser marking layer can be made readable by an infrared camera from either the front surface or the back surface of the information recording medium, and made invisible from either the front surface or the back surface of the information recording medium by shielding the discoloration pattern of the laser marking layer. It is also preferable that the substrate is formed of a material that does not transmit either visible light or infrared light, and in this case, the information recording medium has directivity such that writing by laser light and reading by the infrared camera can performed only from the shielding layer side of the information recording medium.

In the information recording medium according to the present invention, it is preferred that the brightness L value of the shielding layer is 60 or more, and the shielding layer is white. The white shielding layer having an L value of 60 or more corresponds to method 1, in which a material that reflects visible light in the whole wavelength region is used, i.e. the first method among the above-described methods for inhibiting transmission of visible light. It is preferable that the L value is 60 or more because the appearance of color in formation of a picture pattern on the shielding layer is improved.

Further, it is preferred that the substrate also has an L value of 60 or more and is white, because the appearance in formation of a picture pattern on the back surface of the information recording medium is improved, as in the case of the shielding layer.

Here, it is preferable that an intermediate layer which contains a colorant and transmits infrared light is interposed between the shielding layer and the laser marking layer. The intermediate layer corresponds to methods 2 and 3 for inhibiting transmission of visible light, i.e. the method in which the transmittance is reduced in the whole of the visible light region or a part of the visible light region. Preferably, the intermediate layer contains a dye-based coloring material for transmitting infrared light with a wavelength of 780 nm or more.

Particularly, the intermediate layer is preferably a stained film substrate, especially a stained plastic substrate.

The gas permeability of at least one of the substrate and the shielding layer (or the intermediate layer if it is provided) adjacent to the laser marking layer is preferably 1 g/(m²·24 hr·1 atm) or more, further preferably 50 g/(m²·24 hr·1 atm) or more at 20° C.

A porous substrate through which a gas can pass in the thickness direction is more preferable, and a paper substrate formed of fibers, or a substrate obtained by subjecting a film to fine-hole machining is preferably used.

In the information recording medium according to the present invention, the laser marking layer is discolored by irradiation of laser light, and therefore, for example in inspection and registration in the process for production of the information recording medium according to the present invention, information, such as a pattern formed by irradiation of laser light, can be easily recognized.

The reflectance of light of a wavelength of 780 nm or more of the laser marking layer is reduced by irradiation of laser light, so that information recorded by irradiation of laser light can be read externally in infrared light. The shielding layer on the laser marking layer absorbs and reflects visible light to reduce transmission of visible light, and thus serves to hide a discolored portion of the laser marking layer, which is discolored by laser light, so that the information can be made invisible externally.

Further, in the information recording medium according to the present invention, the laser marking layer is discolored by irradiation of laser light, and therefore, for example, on a pattern once formed by irradiation of laser light, a code pattern can be additionally recorded afterwards. Thus, information can be easily changed and added.

DETAILED DESCRIPTION

Hereinafter, embodiments of the present invention will be described in detail.

As illustrated in FIGS. 1 to 4, an information recording medium according to the present invention includes: a substrate; a laser marking layer which has a reduced reflectance to light with a wavelength of 780 nm or more and is discolored by irradiation of laser light, the laser marking layer being provided on the substrate; and a shielding layer which transmits infrared light, and absorbs or reflects visible light to reduce transmission of visible light, the shielding layer being provided on the laser marking layer.

In the information recording medium, the laser marking layer has a reduced reflectance to light with a wavelength of 780 nm or more by irradiation of laser light, and thus information, such as a predetermined code pattern, is formed by a portion of the laser marking layer which is irradiated with laser light to reduce the reflectance and a portion of the laser marking layer which is not irradiated with laser light. The shielding layer provided on the laser marking layer transmits infrared light, so that the code pattern or the like can be read externally via the shielding layer in infrared light.

In the information recording medium, a portion of the laser marking layer which is irradiated with laser light is discolored, but the shielding layer absorbs or reflects visible light, and therefore the laser light-irradiated portion and the laser light-non-irradiated portion of the laser marking layer are hidden by the shielding layer, and are thus invisible from a surface on the shielding layer side.

Further, the information recording medium has the advantage that since materials contained in the laser marking layer are common, the degree of freedom of material selection is high, resulting in easy design. Quality verification of the materials themselves, inspection of a printed state, and prior verification in a production process, such as registration, can be conducted in a visible state in which the shielding layer is not laminated. Thus, these procedures can be easily conducted by visual observation.

Substrate: For the substrate, a synthetic paper or a plastic film may be used, because the substrate is required to have mechanical strength, dimensional stability, heat resistance and the like. More specifically, polyethylene terephthalate, stretched polypropylene, polycarbonate, polyimide, polyamide, cellulose, acetylcellulose diester, acetylcellulose triester, stretched polyethylene, polybutylene terephthalate, or the like may be used.

In particular, it is preferable to use a plastic film composed of polyethylene terephthalate, or a paper substrate, because such a material is easy to handle in production of the information recording medium, and is inexpensive. For the thickness of the substrate, a desired thickness can be selected in view of workability of a reading apparatus and a user that handle the information recording medium, and conveyance property in production of the information recording medium, and the thickness of the substrate is preferably 10 μm to 400 μm in light of the strength of the information recording medium and workability (flexibility) in handling of the information recording medium.

Figure 1:
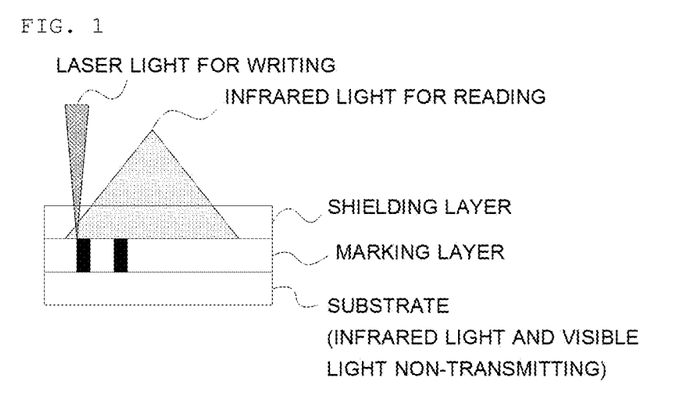
FIG. 1 is a schematic view showing a first embodiment of the present invention.

In a first embodiment of the present invention, an infrared light-non-transmitting substrate which does not transmit infrared light (infrared light for reading) with a wavelength of 780 nm to 1500 nm may be used as the substrate as shown in FIG. 1. Such a substrate may have a maximum transmittance of 1% or less to the infrared light.

As a specific example of the infrared light-non-transmitting substrate, a synthetic paper or a plastic film may be used in light of mechanical strength, dimensional stability, heat resistance and the like. For example, polyethylene terephthalate, stretched polypropylene, polycarbonate, polyimide, polyamide, cellulose, acetylcellulose diester, acetylcellulose triester, stretched polyethylene, polybutylene terephthalate or the like may be used, and a substrate containing a white pigment, a black pigment or the like, or a porous substrate containing bubbles may be used.

Figure 2:
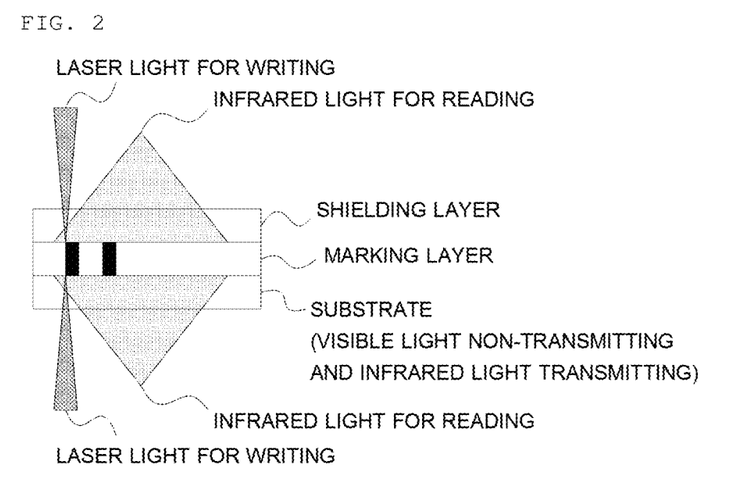
FIG. 2 is a schematic view showing a second embodiment of the present invention.

In another embodiment of the present invention, an infrared light-transmitting substrate which transmits infrared light (laser light for writing, infrared light for reading) with a wavelength of 800 nm to 1500 nm may be used as the substrate as shown in FIG. 2. Such a substrate may have a minimum transmittance of 50% or more to infrared light with a wavelength to be used, and it is desirable to use a material having a transmittance of 70% or more in order to decrease a loss.

When an infrared ray-transmitting substrate is used, the discoloration pattern of a laser marking layer discolored to, for example, black by irradiation of laser light can be shielded so as to be invisible from a surface on the substrate side (substrate outer surface that constitutes the outside of the information recording medium), while a code pattern can be formed on the laser marking layer by irradiation of laser light from the surface on the substrate side because the substrate transmits laser light.

Examples of the infrared ray-transmitting substrate may include plastic films of polyolefins, polycarbonate, polyethylene terephthalate, polyethylene naphthalate, acryl, polyvinyl chloride, polyimide and the like. Preferably, the substrate further contains a coloring material for reducing the visible light transmittance. Polyethylene terephthalate stained with a dye is preferable because it has satisfactory environmental resistance, and the reflectance of wavelength components effective for shielding discoloration of the laser marking layer can be selectively reduced by selecting the type of a dye.

Additives for improving weather resistance, heat resistance and the like, and materials for blocking environmental factors having harmful effects, such as an ultraviolet absorber, each of which is appropriate to the use environment of the information recording medium, may be mixed, or coated films of these materials may be formed on the substrate.

Preferably, the substrate for use in the present invention is itself excellent in heat resistance. Accordingly, occurrence of damage such as thermal deformation caused by heat generated from the laser marking layer by irradiation of laser light is prevented. In the present invention, the heat resistance means that the glass transition temperature is 60° C. or higher so that deformation does not occur at a temperature at which the laser marking layer generates heat in irradiation of laser light. Materials having a low glass transition temperature include polyethylene and polypropylene, and use of such a material as the substrate has the disadvantage that strain resulting from thermal deformation caused by heat generation in irradiation of laser light is visible in the external appearance of the medium, and the like.

Preferably, the substrate for use in the present invention is itself excellent in gas permeability. In some range of conditions, discoloration (color difference between the irradiated section and the non-irradiated section) can be increased by increasing irradiation energy of laser light to be used (increasing the power, increasing the irradiation time, or the like) even when the same laser marking layer is used. However, when irradiation energy of laser light is increased, heat generation and decomposition of the laser marking layer may be accelerated to generate a gas in a large amount. Accordingly, for smoothly releasing the generated thermally decomposed gas to outside, a porous substrate through which a gas can pass in the thickness direction is more preferable, and a paper substrate formed of fibers, or a substrate obtained by subjecting a film to fine-hole machining is preferably used. Alternatively, when a plastic substrate which is not subjected to hole machining or the like is used as the substrate, a material which naturally easily transmits a gas is preferable, and the gas permeability is especially preferably 1 g/(m²·24 hr·1 atm) or more at 20° C. in terms of a permeability to $CO_2$.

Here, the gas permeability can be measured by the method provided in JIS K7126-1. As the substrate excellent in heat resistance and gas permeability, a substrate obtained by providing fine holes in polyethylene terephthalate having a glass transition temperature of 60° C. or higher, so that the substrate is excellent in both heat resistance and gas permeability, or a paper substrate is suitably used.

Laser marking layer: In the present invention, by irradiation of laser light, the laser marking layer has a reduced reflectance to light with a wavelength of 780 nm or more, and is discolored at a portion irradiated with laser light.

However, by irradiation of laser light, reduction of the reflectance to light in the whole wavelength range of not less than 780 nm is not required, and the reflectance to light in the wavelength of not less than 780 nm may be generally reduced. Preferably, the reflectance particularly to infrared light having a wavelength at which the sensitivity of the light-receiving sensor is high is reduced.

The reflectance can be measured by a spectrophotometer, regular reflection or diffuse reflection can be measured, and a laser light-non-irradiated section and a region irradiated and discolored (irradiated section) can be measured. Measurement of the reflectance in the present invention is performed by measuring diffuse reflection with regular-reflected light removed by a light trap under the condition of an integrating sphere diameter of ϕ150 and an incident angle of VI° using a U-3310 Spectrometer manufactured by Hitachi High-Technologies Corporation. For measurement of regular reflection, the regular reflectance is measured under the condition of an integrating sphere diameter of ϕ60 and an incident angle of 10° using a U-4000 manufactured by Hitachi High-Technologies Corporation. The measurement is performed in a range of 780 to 1500 nm as a wavelength region for measuring the infrared light reflectance.

In the case where the light reception angle of the infrared camera is not at the position of the regular reflection angle with respect to the irradiation angle (incident angle) of infrared light for reading, measurement data of the diffuse reflectance can be used to make a determination.

Figure 5:
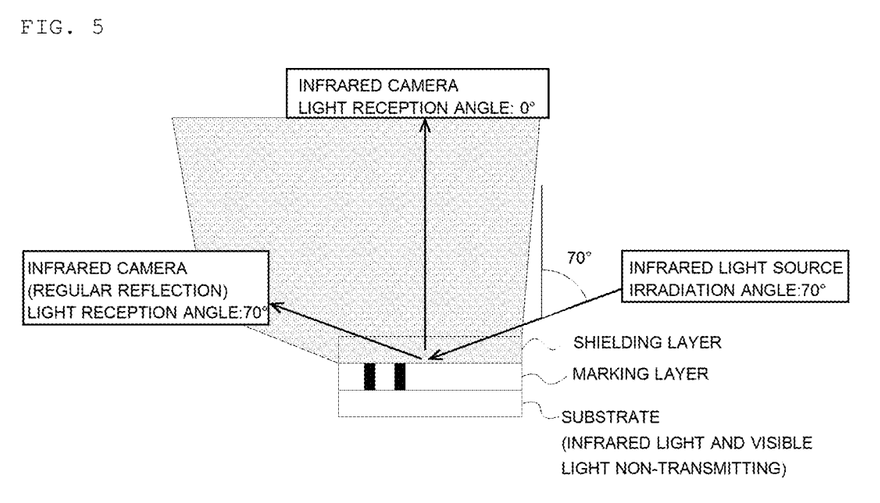
FIG. 5 is a schematic view illustrating an irradiation angle and a light reception angle of infrared light at the time of reading information provided to a laser marking layer.

The difference in reflectance between the laser light-irradiated section and the laser light-non-irradiated section of the laser marking layer may be considered as a reflectance at the light reception angle of the infrared camera with respect to the irradiation angle of infrared light at the time of reading information as illustrated in FIG. 5. FIG. 5 shows an example in which the irradiation angle of infrared light is 70°, and in this case, the regular reflectance can be used at a light reception angle of 70°, and the diffuse reflectance can be used at a light reception angle of 0°.

When the difference in reflectance between the laser light-irradiated section and the laser light-non-irradiated section of the laser marking layer is large, the degree of visible discoloration tends to be high, and the valued of $\Delta E^*ab$ tends to be 20 or more. The occurrence of a large decrease in infrared light reflectance is high, particularly in a laser marking layer having a large difference with the $\Delta E^*ab$ value being 20 or more, and the brightness tends to decrease from the brightness of a white system having a high brightness with the L value being 80 or more after irradiation of laser light to the brightness of a black system as the L value decreases by $\Delta L$:20 or more after irradiation of laser light. Therefore, it is preferable to select a laser marking layer having a high discoloration degree.

As a method for measuring the $\Delta E^*ab$ value expressing a degree of discoloration, it can be quantified as a color difference from a $L^*a^*b^*$ color system using a spectrophotometer.

A desired discoloration pattern is formed on the laser marking layer by a laser printing apparatus or the like, and the laser marking layer may include a layer with a color developer added to a resin that is a main agent. Here, when the laser marking layer is irradiated with laser light (e.g. 1064 nm), the added color developer absorbs laser light to generate heat, and by the heat generation, the resin surrounding the color developer is carbonized to develop black or the like (be discolored), so that a discoloration pattern can be formed. Here, a portion that develops a color absorbs infrared light (e.g. 780 nm to 1500 nm), but a portion that does not develop a color reflects infrared light, and therefore when the laser marking layer after irradiation of laser light is read by an infrared camera, for example, the portion reflecting infrared light appears white, while the portion absorbing infrared light appears black, and this contrast can be used to read the discoloration pattern.

The resin to be used in the laser marking layer is not particularly limited as long as it is carbonized by heat generation in the color developer, and for example, a composition containing as a main component one or more of monomers, prepolymers, oligomers or polymers that constitute resins including polyvinyl chloride-based resins, polylactic acid, polyvinyl acetate-based resins, polyacryl-based or polymethacryl-based resins, polyvinyl alcohol-based resins, ethylene copolymers, polyvinyl acetal-based resins, rubber-based resins, polyester-based resins, polyamide-based resins, polyimide resins, polyamidimide resins, polyolefin-based resins, phenol-based resins, amino-plast-based resins, epoxy-based resins, polyurethane-based resins, polyester urethane resins, silicone-based resins, cellulose-based resins, and the like may be used.

The color developer is not particularly limited as long as it is a material which absorbs light with a wavelength of 780 nm or more to develop color, but it is preferably a material which absorbs laser light to generate heat, so that a resin surrounding the color developer is carbonized to be blackened. Specifically, for example, bismuth oxide, neodymium oxide, copper molybdenum composite oxide, antimony-doped tin oxide-coated mica and antimony-doped tin oxide/titanium oxide/silicon dioxide-coated mica may be used alone, or used in combination of two or more thereof.

Additives such as a colorant, a filling agent (filler), a lubricant and a plasticizer may be added to the laser marking layer as necessary.

The thickness of the laser marking layer may be 1 to 25 μm, preferably 7 to 20 μm. When the thickness of the laser marking layer is less than 1 μm, color development may be insufficient, and when the thickness of the laser marking layer is more than 25 μm, laser light does not thoroughly spread in the depth direction, and therefore there is no difference in color development even when the thickness is made larger.

Figure 4:
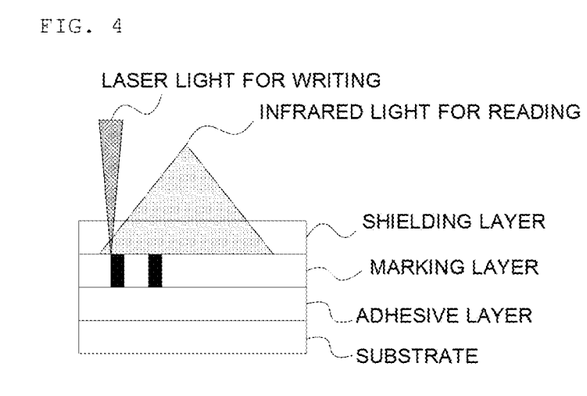
FIG. 4 is a schematic view showing a fourth embodiment of the present invention.

Depending on the materials of the laser marking layer and the substrate, an adhesive layer may be provided between the laser marking layer and the substrate, as shown in FIG. 4, for bonding the laser marking layer to the substrate as necessary. When an adhesive layer is provided, the adhesive layer is preferably excellent in gas permeability like the substrate, and the $CO_2$ gas permeability of the adhesive layer is preferably 1 g/($m^2 \cdot 24$ hr·1 atm) or more at 20° C.

The type of the adhesive layer is not particularly limited as long as it is capable of bonding the substrate and the laser marking layer to each other, and specific examples thereof may include acryl-based materials, rubber-based materials, polyester-based materials, urethane-based materials, vinyl-based materials and silicone-based materials. For the adhesive layer, a pressure sensitive adhesive having tackiness may be used, and a curing agent can be blended.

A hot-melt-type material can be used for the adhesive layer, where an adhesive resin is melted by thermal lamination to bond the substrate and the laser marking layer to each other. As a bonding method, a heating and pressurization method using a squeegee or a roller, a press method using a weighting plate, or a vacuum method of releasing air from the bonded surface can be used to perform the bonding.

Shielding layer: In the present invention, the shielding layer is, for example, a layer which transmits infrared light (laser light for reading) with a wavelength of 780 nm or more, and absorbs or reflects visible light to reduce visible transmitted light. Since the shielding layer transmits infrared light, a surface on the shielding layer side (substrate outer surface that constitutes the outside of the information recording medium) is irradiated with infrared light for reading by using an infrared LED or the like, and the infrared light is transmitted, so that a discoloration pattern formed on the laser marking layer between the shielding layer and the substrate is made readable by an infrared camera. On the other hand, since the shielding layer reflects or absorbs visible light, the discoloration pattern formed on the laser marking layer is hidden to be made invisible from the surface on the shielding layer side.

The shielding layer may have a minimum transmittance of 3% or more, more preferably 5% or more to the infrared light with a wavelength of 780 nm or more, and have a transmittance of 60% or less, more preferably 30% or less to visible light in terms of a transmittance to light with a wavelength at which the reflectance of the laser marking layer in the reflection spectrum changes most greatly before and after irradiation of laser light.

Irrespective of the color presented by the discoloration pattern of the laser marking layer, the discoloration pattern can be effectively shielded by using a black shielding layer, but the shielding layer is preferably a white shielding layer when a design such as picture pattern is provided on the shielding layer. The shielding layer may have a transmittance of 3% or more, preferably 5% or more to laser light for writing for effectively transmitting laser light at the time when the laser marking layer is caused to develop a color by laser light.

The shielding layer may be a layer containing at least a resin and a shielding material, and examples of the resin to be used in the layer may include compositions containing as a main component one or more of monomers, prepolymers, oligomers or polymers that constitute resins including polyvinyl chloride-based resins, polyvinyl acetate-based resins, polyacryl-based or polymethacryl-based resins, polyvinyl alcohol-based resins, ethylene copolymers, polyvinyl acetal-based resins, rubber-based resins, polyester-based resins, polyamide-based resins, polyimide resins, polyamidimide resins, polyolefin-based resins, phenol-based resins, amino-plast-based resins, epoxy-based resins, polyurethane-based resins, polyester urethane resins, silicone-based resins, cellulose-based resins, and the like.

The shielding material for the shielding layer may be appropriately selected from an inorganic pigment, an organic pigment, a dye and the like, and used. Here, as the inorganic pigment, silica, alumina, a fluorine-based resin (such as magnesium fluoride or calcium fluoride), a ceramic such as titanium oxide or zirconia, glass, or the like may be used. As the organic pigment, crosslinked acrylic particles, a crosslinked polystyrene resin, a melamine resin, a phenol resin, an epoxy resin, polycarbonate, carbon black, aniline black, titanium black, acetylene black, inorganic pigment hematite, perylene black or the like may be used. As the dye, a well-known organic dye such as an azo-based dye, a condensed azo-based dye, phthalocyanine-based dye, an anthraquinone-based dye, an indigo-based dye, a perinone-based dye, a perylene-based dye, a dioxane-based dye, a quinacridone-based dye, a methine-based dye, an isoindolinone-based dye, a quinophthalone-based dye, a pyrrole-based dye, a thioindigo-based dye or a metal complex-based dye may be used.

For providing a design such as a picture pattern on the shielding layer, the shielding layer is preferably a white shielding layer, and specifically, the L value showing a brightness is preferably 60 or more. Here, the brightness L value is a value measured at 2°/D65 in the SCE measurement mode using a spectrophotometer manufactured by KONICA MINOLTA, INC. As the shielding layer, mention is made of, for example, a resin film in which a white pigment is dispersed.

The shielding layer is preferably one having resistance to heat generated in the laser marking layer by irradiation of laser light, and specifically, the glass transition temperature of the shielding layer is preferably 50° C. or higher in connection with heat resistance. For the shielding layer, resins having polymethyl methacrylate, polyethyl methacrylate or polybutyl methacrylate as a main backbone among acryl-based resins, polyester resins, polyurethane resins, silicone resins, vinyl resins, phenol resins, epoxy resins, polyamide resins and the like may be used alone or in combination, and the glass transition temperature can be increased by mixing the resins with a curing agent to perform heat-curing and photo-curing. The shielding layer can be formed by dissolving the resins in a solvent, dissolving or dispersing a shielding material therein, forming the resulting solution or dispersion into a film, and removing the solvent.

A film substrate containing a shielding material can be used instead of a coated film, and examples of the film substrate include white polyethylene terephthalate substrates made to have both an infrared light transmittance and a visible light shielding property by mixing a small amount of titanium oxide, and film substrates obtained by staining transparent polyethylene terephthalate with a dye.

The gas permeability of the shielding layer is preferably 1 $g/(m^2 \cdot 24\ hr \cdot 1\ atm)$ or more, more preferably 50 $g/(m^2 \cdot 24\ hr \cdot 1\ atm)$ or more at 20° C. Accordingly, when a gas is generated in a large amount from the laser marking layer in irradiation of laser light, the gas is effectively diffused to prevent swelling by gas accumulation, or the like. As the shielding layer, mention is made of, for example, one obtained by subjecting a PET film stained with a dye to fine-hole machining.

Figure 3:
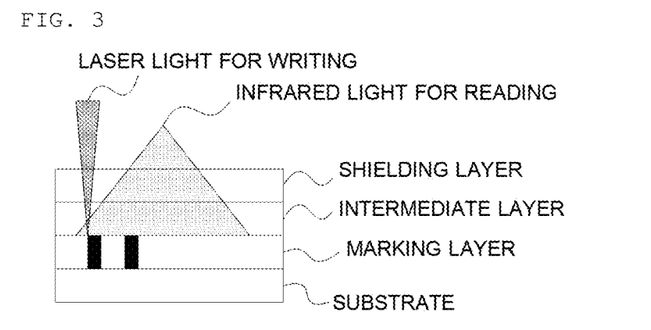
FIG. 3 is a schematic view showing a third embodiment of the present invention.

Intermediate layer: Preferably, an intermediate layer which contains a colorant and transmits infrared light with a wavelength of 780 nm or more is interposed between the shielding layer and the laser marking layer as shown in FIG. 3. By providing the intermediate layer, the laser marking layer can be sufficiently shielded even when the discoloration degree of the discoloration pattern of the laser marking layer is high.

It is desirable that the shielding layer presents white with the brightness L value being 60 or more for improving the appearance by providing a design on the shielding layer. Here, when the discoloration degree of the laser marking layer is high, the laser marking layer cannot be sufficiently shielded by only the white shielding layer, and thus the discoloration pattern may be visible from outside the medium. Thus, an intermediated layer is provided, and the intermediate layer serves to shield discoloration of the laser marking layer, so that the whiteness of the shielding layer is increased to provide an information recording medium having a high shielding property and whiteness degree easily.

The intermediate layer contains a colorant that absorbs visible light, so that the transmittance to light with a wavelength in a range where the reflectance of the laser marking layer changes most greatly before and after irradiation of laser light may be 70% or less, more preferably 60% or less.

The intermediate layer is preferably one having resistance to heat generated in the laser marking layer by irradiation of laser light, and specifically, the glass transition temperature of the intermediate layer is preferably 50° C. or higher. Here, an intermediate layer excellent in heat resistance exists between the shielding layer and the laser marking layer, and therefore the shielding layer is not necessarily required to have the heat resistance.

For the intermediate layer, resins having polymethyl methacrylate, polyethyl methacrylate or polybutyl methacrylate as a main backbone among acryl-based resins, polyester resins, polyurethane resins, silicone resins, vinyl resins, phenol resins, epoxy resins, polyamide resins and the like may be used alone or in combination, and the glass transition temperature can be increased by mixing the resins with a curing agent to perform heat-curing and photo-curing. The shielding layer can be formed by dissolving the resins in a solvent, dissolving or dispersing a shielding material therein, forming the resulting solution or dispersion into a film, and removing the solvent.

A film substrate containing a shielding material can be used instead of a coated film, and examples of the film substrate include white polyethylene terephthalate substrates made to have both an infrared light transmittance and a visible light shielding property by mixing a small amount of titanium oxide, and film substrates obtained by staining transparent polyethylene terephthalate with a dye.

The gas permeability of the intermediate layer is preferably 1 $g/(m^2 \cdot 24\ hr \cdot 1\ atm)$ or more, more preferably 50 $g/(m^2 \cdot 24\ hr \cdot 1\ atm)$ or more at 20° C. Accordingly, when a gas is generated in a large amount from the laser marking layer in irradiation of laser light, the gas is effectively diffused to prevent swelling by gas accumulation, or the like. As the intermediate layer, mention is made of, for example, one obtained by subjecting a PET film stained with a dye to fine-hole machining.

The colorant contained in the intermediate layer is not particularly limited, and examples thereof include various kinds of organic pigments such as carbon black-based pigments, phthalocyanine-based pigments, azo-based pigments, disazo-based pigments, quinacridone-based pigments, anthraquinone-based pigments, flavanthrone-based pigments, perylene-based pigments, dioxane-based pigments, condensed azo-based pigments, azomethine-based pigments and methine-based pigments, and inorganic pigments such as lead sulfate, zinc oxide, chromium yellow, zinc yellow, chrome vermilion, red oxide, cobalt violet, ultramarine blue, chromium green, chromium oxide and cobalt green.

The intermediate layer may have a minimum transmittance of 50% or more to infrared light with a wavelength of 780 nm or more.

For writing information in the information recording medium, for example, the information recording medium is irradiated with laser light with a wavelength of 780 nm or more from the shielding layer side, the reflectance to light with a predetermined wavelength at a portion of the laser marking layer on which a pattern is formed is reduced, and the portion on which the pattern is formed is caused to develop, for example, black to form a discoloration pattern, so that information can be written.

Here, the shielding layer on the laser marking layer serves to cover and shield the discoloration pattern, and therefore the discoloration pattern is invisible from the shielding layer side.

For reading the written information afterward, for example, the information recording medium is irradiated with infrared light for reading with a wavelength of 780 nm or more from the shielding layer side, or from the substrate side when the substrate is an infrared ray-transmitting substrate, and the information is read by an infrared camera. In this case, a portion of the laser marking layer at which the reflectance is not reduced appears white relatively, and a portion of the laser marking layer at which the reflectance is reduced appears black relatively. Using this contrast in the laser marking layer in the infrared camera, the discoloration pattern can be read.

As laser light to be used for writing, laser light from a laser which can emit infrared light, for example a $YVO_4$ or $CO_2$ laser, can be used. As infrared light to be used for reading, for example, infrared light from a LED which emits light with various infrared ray wavelengths can be used.

EXAMPLES

Information recording media according to the present invention were experimentally prepared, and the performances thereof were determined. The results thereof will now be described. However, matters that are described here are merely illustrative, and the present invention is not limited thereto.

Example 1

An A4-size paper substrate (UNIFACE W (310 g/m²) manufactured by Nippon Paper Industries Co., Ltd.) was provided as a substrate, a color-developing pigment (42-920A manufactured by Tokan Material Technology Co., Ltd.) obtained by mixing bismuth trioxide and neodymium trioxide and a polyester resin (VYLON V290 manufactured by TOYOBO CO., LTD.) were added in mixed solvent of methyl ethyl ketone/toluene=1/1 to prepare a coating of P (pigment)/R (resin)=15/85 as a laser marking ink, and the coating was applied to the substrate by a Meyer bar in such a manner that the resulting layer had a thickness of 5 µm.

An infrared ray-transmitting white ink (EG50216 IR White manufactured by Teikoku Printing Inks Mfg. Co., Ltd.) was then applied by an applicator method to form a 10 µm-thick shielding layer on the laser marking layer, thereby preparing an information recording medium of Example 1.

Example 2

Using 2117 Elbima (manufactured by TOYO INK CO., LTD.) as a laser marking ink, a laser marking layer was formed by a Meyer bar in such a manner that the laser marking layer had a thickness of 5 µm. As an intermediated layer between the laser marking layer and the shielding layer, a 4 µm-intermediate layer was formed on the laser marking layer by applying an infrared ray-transmitting gray ink (EG50216 IR Black manufactured by Teikoku Printing Inks Mfg. Co., Ltd./EG50216 IR White manufactured Teikoku Printing Inks Mfg. Co., Ltd.=1/1) using a Meyer bar method. An information recording medium of Example 2 was prepared under the same conditions as in Example 1 except for those described above.

Example 3

On an A4-size polyethylene terephthalate film (Blue PET (75 µm) manufactured by TOCHISEN CO., LTD.) stained with a blue dye as an intermediate layer, a laser marking layer was formed under the same conditions as in Example 1. On a surface of the intermediate layer on a side opposite to a surface provided with the laser marking layer, a shielding layer was formed under the same conditions as in Example 1.

A transparent pressure sensitive adhesive film (TD-06a (15 µm) manufactured by TOMOEGAWA CO., LTD.) was bonded to a paper substrate similar to that in Example 1, and the laser marking layer was then bonded to the pressure sensitive adhesive surface of the film to prepare an information recording medium of Example 3.

Example 4

On an A4-size polyethylene terephthalate film (Green PET (75 µm) manufactured by TOCHISEN CO., LTD.) stained with a green dye as an intermediate layer, a laser marking layer was formed under the same conditions as in Example 1. On a surface of the intermediate layer on a side opposite to a surface provided with the laser marking layer, a shielding layer was formed under the same conditions as in Example 1.

A transparent pressure sensitive adhesive film (TD-06a (15 µm) manufactured by TOMOEGAWA CO., LTD.) was bonded to a paper substrate similar to that in Example 1, and the laser marking layer was then bonded to the pressure sensitive adhesive surface of the film to prepare an information recording medium of Example 4.

Example 5

On an A4-size polyethylene terephthalate film (Green PET (75 µm) manufactured by TOCHISEN CO., LTD.) stained with a green dye as an intermediate layer, a laser marking layer was formed under the same conditions as in Example 1. On a surface of the intermediate layer on a side opposite to a surface provided with the laser marking layer, a 5 µm-thick shielding layer was formed by applying an infrared ray-transmitting white coating (HF GV3 RX01 Y1490 IR WHITE manufactured by Seiko advance Ltd.) using a Meyer bar method.

A transparent pressure sensitive adhesive film (TD-06a (15 µm) manufactured by TOMOEGAWA CO., LTD.) was bonded to a paper substrate similar to that in Example 1, and the laser marking layer was then bonded to the pressure sensitive adhesive surface of the film to prepare an information recording medium of Example 5.

Example 6

An information recording medium of Example 6 was prepared under the same conditions as in Example 4 except that an A4-size polyethylene terephthalate film (Red PET (75 µm) manufactured by TOCHISEN CO., LTD.) stained with a red dye was used as an intermediate layer.

Example 7

On an A4-size polyethylene terephthalate film (Blue PET (75 µm) manufactured by TOCHISEN CO., LTD.) stained with a dye as a substrate, the laser marking layer in Example 1 was formed, and the shielding layer in Example 2 was formed on the laser marking layer. Further, on a surface of the substrate on a side opposite to the laser marking surface, a layer identical to the shielding layer was formed under the same conditions to prepare an information recording medium of Example 7.

Example 8

A resin (COPONYL 102X manufactured by The Nippon Synthetic Chemical Industry Co., Ltd.) and a blue dye (BlueP manufactured by Mitsubishi Chemical Corporation) were dissolved in methyl ethyl ketone (MEK) to prepare a coating, and a 3 µm-thick blue dye layer composed of the coating was formed on a transparent PET (T60 (50 μm) manufactured by Toray Industries, Inc.) to prepare an intermediate layer. On the blue dye layer of the intermediate layer formed by laminating the blue dye layer and the transparent PET, a shielding layer was formed from an infrared ray-transmitting white ink similar to that in Example 1, and a laser marking layer similar to that in Example 1 was formed on the transparent PET on a side opposite to the blue dye layer in the intermediate layer. An information recording medium of Example 8 was prepared under the same conditions as in Example 3 except for those described above.

Example 9

Onto a white shielding layer composed of an infrared ray-transmitting white ink in an information recording medium prepared under the same conditions as in Example 4, further a sumi coating (FDF Form CL Sumi M manufactured by TOYO INK CO., LTD.), a red coating (Daicure ABILIO Process Red N manufactured by DIC Graphics Corporation), a yellow coating (Daicure ABILIO Process Transparent Yellow N manufactured by DIC Graphics Corporation) and an indigo blue coating (Daicure ABILIO Process Indigo Blue N manufactured by DIC Graphics Corporation) for formation of a design were applied by offset printing to form a four-color laminate on the whole surface of a card, thereby preparing an information recording medium of Example 9.

In Example 9, the ΔE*ab value in discoloration evaluation described later was measured after formation of the design layer.

Comparative Example 1

On an A4-size polyethylene terephthalate film (PET T60 (75 μm) manufactured by Toray Industries, Inc.) as a shielding layer, a laser marking layer was formed under the same conditions as in Example 1.

A transparent pressure sensitive adhesive film (TD-06a (15 μm) manufactured by TOMOEGAWA CO., LTD.) was bonded to a paper substrate similar to that in Example 1, and the laser marking layer was then bonded to the pressure sensitive adhesive surface of the film to prepare an information recording medium of Comparative Example 1. The shielding layer of Comparative Example 1 does not absorb or reflect visible light.

Comparative Example 2

On an A4-size polyethylene terephthalate film (Yellow PET (75 μm) manufactured by TOCHISEN CO., LTD.) stained with a yellow dye as a shielding layer, a laser marking layer was formed under the same conditions as in Example 1.

A transparent pressure sensitive adhesive film (TD-06a (15 μm) manufactured by TOMOEGAWA CO., LTD.) was bonded to a paper substrate similar to that in Example 1, and the laser marking layer was then bonded to the pressure sensitive adhesive surface of the film to prepare an information recording medium of Comparative Example 2. In Comparative Example 2, the transmittance of the shielding layer in a range of 500 to 780 nm where the difference in diffuse reflectance before and after printing in the laser marking layer was large was as high as 83.6%, and therefore the shielding layer was not able to shield the discoloration pattern of the marking layer.

Comparative Example 3

An information recording medium of Comparative Example 3 was prepared under the same conditions as in Example 9, except that a sumi coating (Daicure ABILIO Process EP Process Sumi N manufactured by DIC Graphics Corporation) was used for formation of a design. In Comparative Example 3, a design was added to the design layer using the black coating composed of carbon black and absorbing infrared light, and therefore the shielding layer did not transmit infrared light.

Evaluation

Formation of a discoloration pattern (information code) in the laser marking layer was performed using a 1064 nm-wavelength laser marker (apparatus name: MD-V9600) manufactured by KEYENCE CORPORATION. For printing conditions, the scanning speed was 2000 mm/s, the frequency was 10 kHz, the laser power was 10% to 30%, and the information code was printed (colored) with a 10 mm×10 mm ■ pattern used as a pseudo-code. After the information code was printed in the information recording medium of each of Examples 1 and 2, the following test was conducted to perform evaluation.

Discoloration/change in reflectance of laser marking layer:

For examining the state of discoloration caused by laser light for Examples 1 and 2 in which laser marking layers were formed from different materials, the laser marking layer before formation of the shielding layer was directly irradiated with laser light to perform laser printing, and color development was examined. Using a spectrophotometer (CM-503d manufactured by KONICA MINOLTA, INC.), the color difference (ΔE*ab) of the information code-printed section (code-printed section) was determined on the basis of the color L*a*b* of the non-printed section (code-non-printed section) of the laser marking layer to evaluate discoloration. The results thereof are shown in Table 1. Here, it is determined that discoloration occurs when the color difference ΔE*ab is 3 or more. Brown color system was developed in Example 1, and a gray color system was developed in Example 2.

TABLE 1

| | Evaluation of discoloration | Laser output | L | a | b | ΔE*ab |
|---|---|---|---|---|---|---|
| Example 1 | Code-printed section (1) | 10% | 88.81 | −0.63 | 3.26 | 6.0 |
| | Code-non-printed section (2) | | 88.62 | −0.62 | 3.19 | |
| Example 1 | Code-printed section (1) | 30% | 88.81 | −0.63 | 3.26 | 40.92 |
| | Code-non-printed section (2) | | 88.62 | −0.62 | 3.19 | |
| Example 2 | Code-printed section (1) | 20% | 96.1 | −3.6 | 8.21 | 21.24 |
| | Code-non-printed section (2) | | 77.82 | −2.14 | −2.51 | |

For the laser marking layer in each of Examples 1 and 2, the diffuse reflectance and the regular reflectance were measured under the foregoing conditions using spectrophotometers U-3310 and U-4000 manufactured by Hitachi High-Technologies Corporation. The results thereof are shown in the form of a graph in FIGS. 6A and 6B and FIGS. 7A and 7B.

Figure 6A:
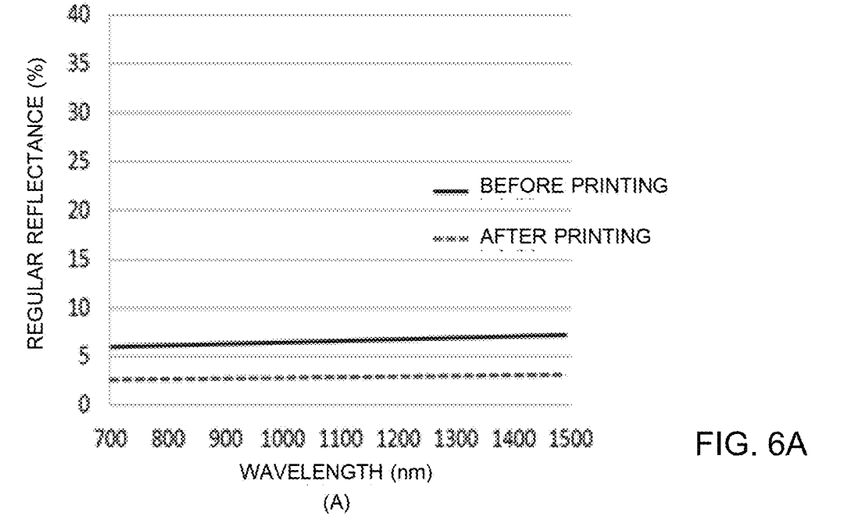
FIGS. 6A and 6B are graphs showing a change in regular reflectance and a change in diffuse reflectance, respectively, with respect to a wavelength in a laser marking layer in Example 1.
Figure 6B:
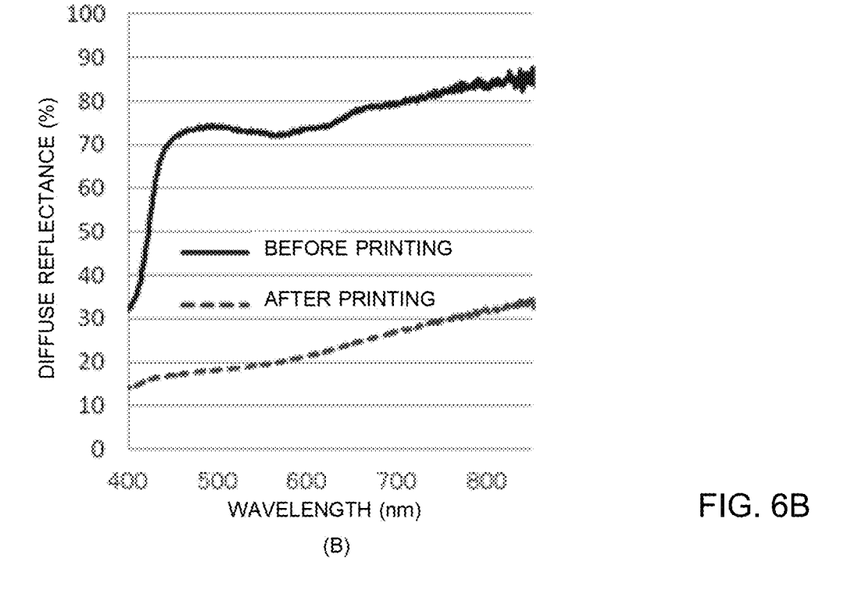

In the laser marking layer in Example 1, the regular reflectance at a wavelength of 850 nm decreased by 4.0% from 6.5% to 2.5% before and after laser printing as shown in FIG. 6A, and the diffuse reflectance at a wavelength of 850 nm decreased by 52% from 85% to 33% before and after printing as shown in FIG. 6B.

Figure 7A:
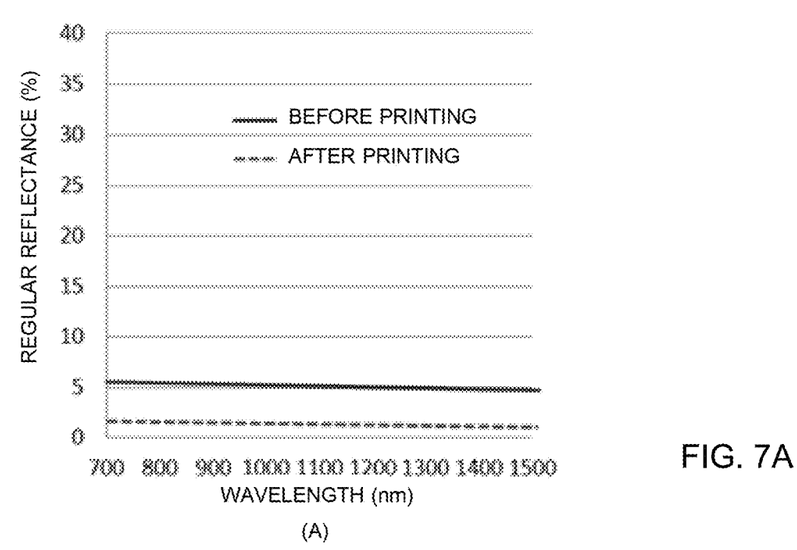
FIGS. 7A and 7B are graphs showing a change in regular reflectance and a change in diffuse reflectance, respectively, with respect to a wavelength in a laser marking layer in Example 2.
Figure 7B:
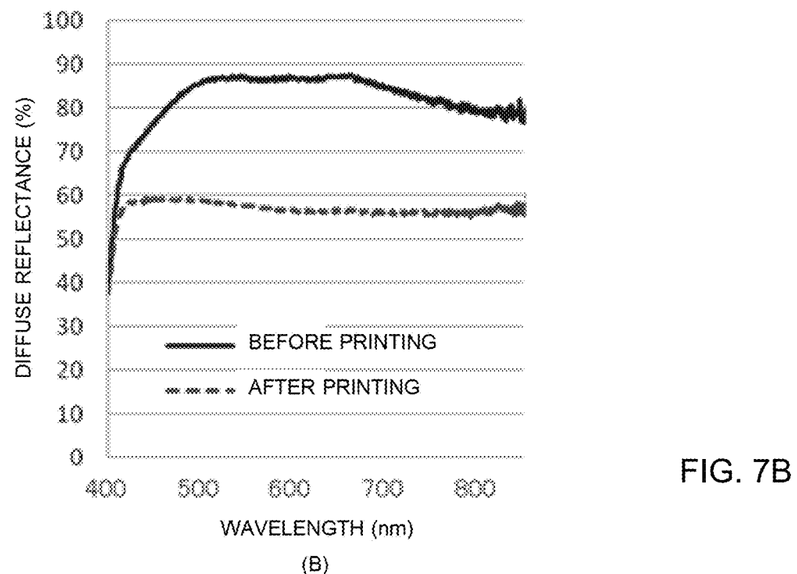

In the laser marking layer in Example 2, the regular reflectance at a wavelength of 850 nm decreased by 3.0% from 5.0% to 2.0% before and after laser printing as shown in FIG. 7A, and the diffuse reflectance at a wavelength of 850 nm decreased by 22% from 80% to 58% before and after printing as shown in FIG. 7B.

From the diffuse reflection spectrum before and after printing, it was confirmed that there was a large reflectance difference at a wavelength of 500 to 780 nm in both Example 1 and Example 2.

Figure 8A:
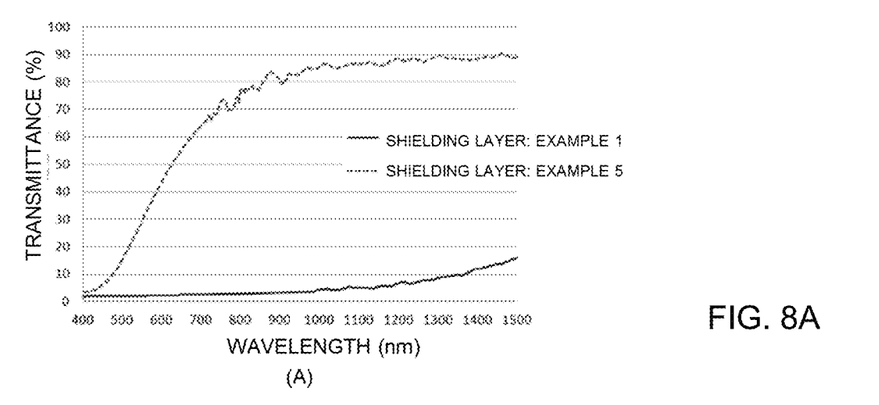
FIGS. 8A, 8B and 8C are graphs showing a change in transmittance, a change in regular reflectance and a change in diffuse reflectance, respectively, with respect to a wavelength in a shielding layer used in each of Examples 1 and 5.
Figure 8B:
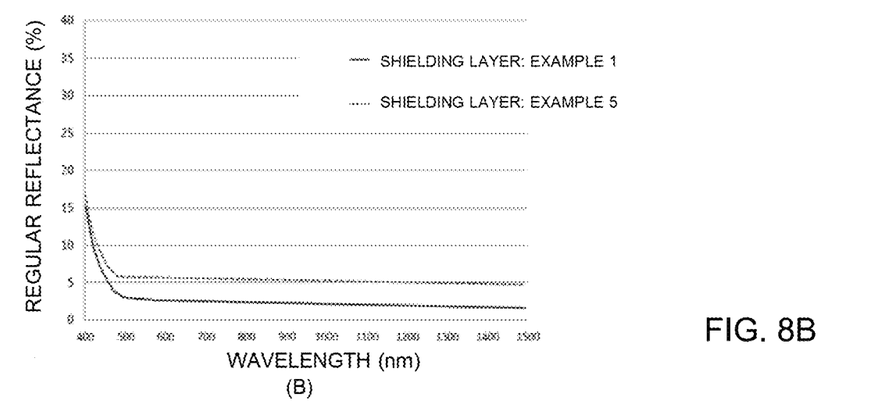
Figure 8C:
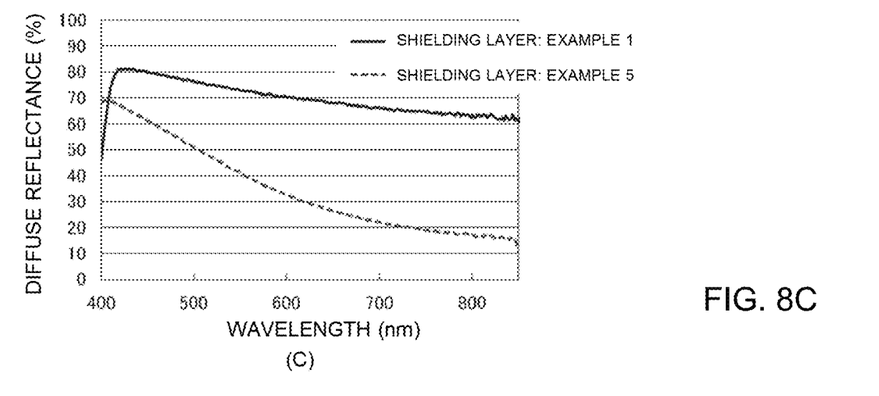

Optical properties of shielding layer:

For the shielding layer in Example 1 and the shielding layer in Example 5, a change in each of transmittance, regular reflectance and diffuse reflectance with respect to a wavelength was measured. The results thereof are shown in the form of a graph in FIGS. 8A, 8B and 8C.

Figure 9:
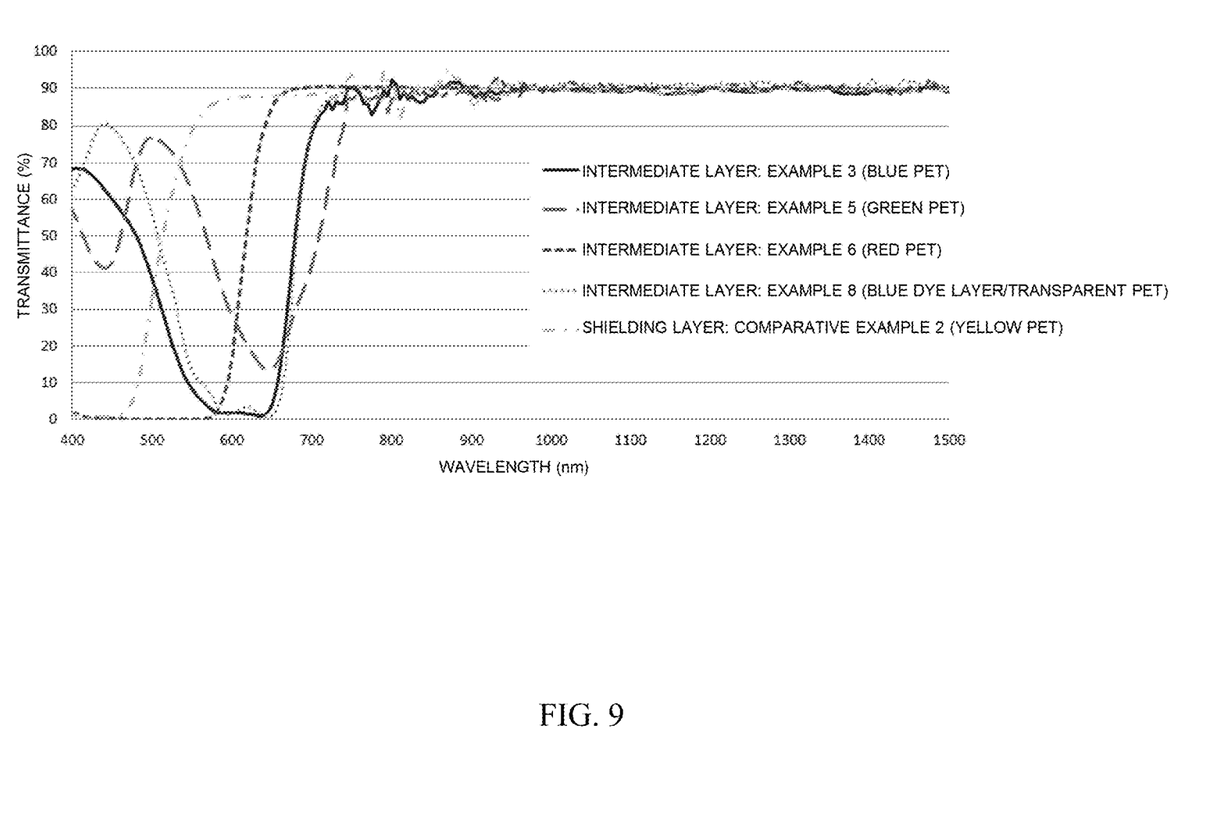
FIG. 9 is a graph showing a change in transmittance with respect to a wavelength in an intermediate layer used in each of Examples 3, 5, 6 and 8, and in a shielding layer used in Comparative Example 2.

Optical properties of intermediate layer:

As the optical properties of the intermediate layer used in each of Examples 3, 5, 6 and 8, and the shielding layer used in Comparative Example 2, a change in transmittance with respect to a wavelength was measured to obtain a graph as shown in FIG. 9. FIG. 9 shows that the area ratio of the transmission spectrum for each of the intermediate layers and the shielding layer in a wavelength range of 500 nm to 780 nm was as low as 60% or less except for that in Comparative Example 2 as shown in Table 2. Here, the area ratio of the transmission spectrum in a wavelength range of 500 nm to 780 nm can be calculated from the following equation.

Area ratio={transmittance×wavelength range(780−500=280 nm)}/{100%×280 nm}

TABLE 2

| Intermediate layer | Transmission spectrum area ratio |
|---|---|
| Example 3 | 37.9% |
| Example 5 | 51.6% |
| Example 6 | 53.7% |
| Example 8 | 41.2% |
| Comparative Example 2 | 83.7% |

Shielding Property:

Using a spectrophotometer (CM-503d manufactured by KONICA MINOLTA, INC.), the color difference (ΔE*ab) of code-printed section was determined on the basis of the color L*a*b* of the non-printed section from the surface side of the shielding layer to evaluate the information code shielding property in the information recording media of Examples 1 to 9 and Comparative Examples 1 to 3. The results thereof are shown in Table 3. It is determined that a shielding property is exhibited when the color difference ΔE*ab is less than 3.

Readability:

In the information recording media of Examples 1 to 9 and Comparative Examples 1 to 3, a CMOS sensor-mounted board camera (manufactured by Primetech Engineering Corp.) as an infrared camera was disposed so as to face the information recording medium, the information recording medium was irradiated with LED light as infrared light (850 nm) at incident angles of 0° and 60° from the surface side of the shielding layer to project the printed code on a display, and whether the code was readable or not was determined by visual observation. The results thereof are shown in Table 3.

TABLE 3

| | Laser output | ΔE*ab | Shielding property | L | Infrared camera readability |
|---|---|---|---|---|---|
| Example 1 | 10% | 1.84 | ○ | 91.0 | ○ |
| Example 2 | 20% | 0.9 | ○ | 90.5 | ○ |
| Example 3 | 30% | 1.01 | ○ | 86.6 | ○ |
| Example 4 | 30% | 2.94 | ○ | 87.15 | ○ |
| Example 5 | 10% | 2.9 | ○ | 73.68 | ○ |
| Example 6 | 30% | 1.34 | ○ | 86.75 | ○ |
| Example 7 | 10% | 1.8 | ○ | 90.5 | ○ |
| Example 8 | 20% | 2.3 | ○ | 89.5 | ○ |
| Example 9 | 20% | 0.9 | ○ | 87.15 | ○ |
| Comparative Example 1 | 10% | 5.2 | X | 79.8 | ○ |
| Comparative Example 2 | 30% | 6.16 | X | 87.7 | ○ |
| Comparative Example 3 | 20% | 0.9 | ○ | 87.15 | X |

It is apparent from the results shown in Table 3 that in all of Examples 1 to 9, the color difference ΔE*ab between the code-printed section and the code-non-printed section was less than 3, so that a high shielding property was exhibited, and the information code was readable in infrared light.

In Examples 1 to 9, the color difference between the printed section and the non-printed section was sufficient to be readable as an information code, and the information code was invisible in the external appearance of the card, so that a sufficient shielding property was exhibited.

What is claimed is:

1. An information recording medium, comprising:
   a substrate;
   a laser marking layer having a reduced reflectance of infrared light of a wavelength of 780 nm or more and that is discolored by irradiation of laser light, the laser marking layer being provided on the substrate; and
   a shielding layer that transmits infrared light and that absorbs or reflects visible light, the shielding layer being provided on the laser marking layer;
   wherein an intermediate layer which contains a colorant and transmits infrared light is interposed between the shielding layer and the laser marking layer; and
   wherein the shielding layer is white and has a brightness value L of 60 or more.

2. The information recording medium according to claim 1, wherein the reflectance of infrared light of a wavelength of 780 nm or more of the laser marking layer is reduced by 3% or more by irradiation of laser light.

3. The information recording medium according to claim 1, wherein the substrate is opaque to visible light.

4. The information recording medium according to claim 1, wherein the substrate transmits infrared light to ensure that a discoloration pattern, formed on the laser marking layer by irradiation with laser light, is readable by an infrared camera from a surface of the substrate on a side opposite to the laser marking layer, and wherein the discoloration pattern of the laser marking layer is shielded to be invisible from the surface of the substrate.

5. The information recording medium according to claim 1, wherein at least one of the substrate and the shielding layer has a gas permeability of 1 g/(m²·24 hr·1 atm) or more.

6. The information recording medium according to claim 1, wherein the intermediate layer is a stained film substrate.

* * * * *